United States Patent [15] 3,686,445

Barnaby et al. [45] Aug. 22, 1972

[54] TIMING SIGNAL GENERATORS

[72] Inventors: Bernard Sydney Barnaby, 139 Musley Hill, Ware; Graham Webb, 18a Talbut Rd., Wembley; Robert Andrew Stevenson, 34 Hawkshead Place, Newton Aycliffe, all of England

[22] Filed: March 1, 1971

[21] Appl. No.: 122,582

[52] U.S. Cl. .................179/84 R, 179/81 R, 328/43, 328/61

[51] Int. Cl.....H03k 17/02, H03k 21/00, H04m 1/26

[58] Field of Search ...179/81 R, 84 R, 84 A; 328/43, 328/39, 94, 61

[56] References Cited

UNITED STATES PATENTS

| | | | |
|---|---|---|---|
| 3,183,454 | 5/1965 | Streit | 179/84 R |
| 2,791,638 | 5/1957 | Houdek | 179/81 R |
| 3,548,175 | 12/1970 | Tomlin | 328/39 |
| 3,551,822 | 12/1970 | McNelis | 328/94 |

*Primary Examiner*—Kathleen H. Claffy
*Assistant Examiner*—William A. Helvestine
*Attorney*—Kirschstein, Kirschstein, Ottinger & Frank

[57] ABSTRACT

A timing circuit for use in converting from push-button derived signals to dial-type impulse trains, in which the different intervals required in the conversion are obtained by dividing-down signals from a master oscillator operating at 20 kH. The timing circuit uses MOS integrated circuits and comprises three "twisted ring" dividing circuits of different division ratios, different interval timing signals being derived from coincident output signals from two of these dividing circuits and from all three of the dividing circuits respectively.

7 Claims, 4 Drawing Figures

INVENTORS
BERNARD SYDNEY BARNABY
GRAHAM WEBB
ROBERT ANDREW STEVENSON
BY
Kemon, Kemon, Ager & Frank
ATTORNEYS

INVENTORS
BERNARD SYDNEY BARNABY
GRAHAM WEBB
ROBERT ANDREW STEVENSON
BY

ATTORNEYS

INVENTORS
BERNARD SYDNEY BARNABY
GRAHAM WEBB
ROBERT ANDREW STEVENSON
BY
ATTORNEYS

TIMING SIGNAL GENERATORS

The present invention relates to timing signal generators.

In particular although not exclusively the invention is concerned with timing signal generators for use in impulse transmitters for push-button telephone instruments, in which electric signals generated by operation of push buttons are converted into trains of Strowger-type impulses for signalling the digits of a telephone number to be called.

According to one aspect of the present invention a timing signal generator comprises a pulse generator, two or more frequency dividing circuits each responsive to a different number of pulses from the output of said pulse generator to provide a respective output pulse, and means to derive interval timing pulses in response to coincident output pulses from at least two of said frequency dividing circuits.

According to another aspect of the present invention in an electric impulse transmitter for a push-button telephone instrument, the transmitter including electric circuit means for converting electric signals generated by operation of push-buttons of the instrument into trains of Strowger-type dialling impulses, a timing signal generator comprises a pulse generator, two or more frequency dividing circuits each responsive to a different number of pulses from the output of said pulse generator to provide a respective output pulse, and means to derive timing signals in response to coincident out pulses from at least two of said frequency dividing circuits.

The timing signals may be utilized to time the "loop make" and "loop break" intervals of said trains of impulses.

Figure 1:
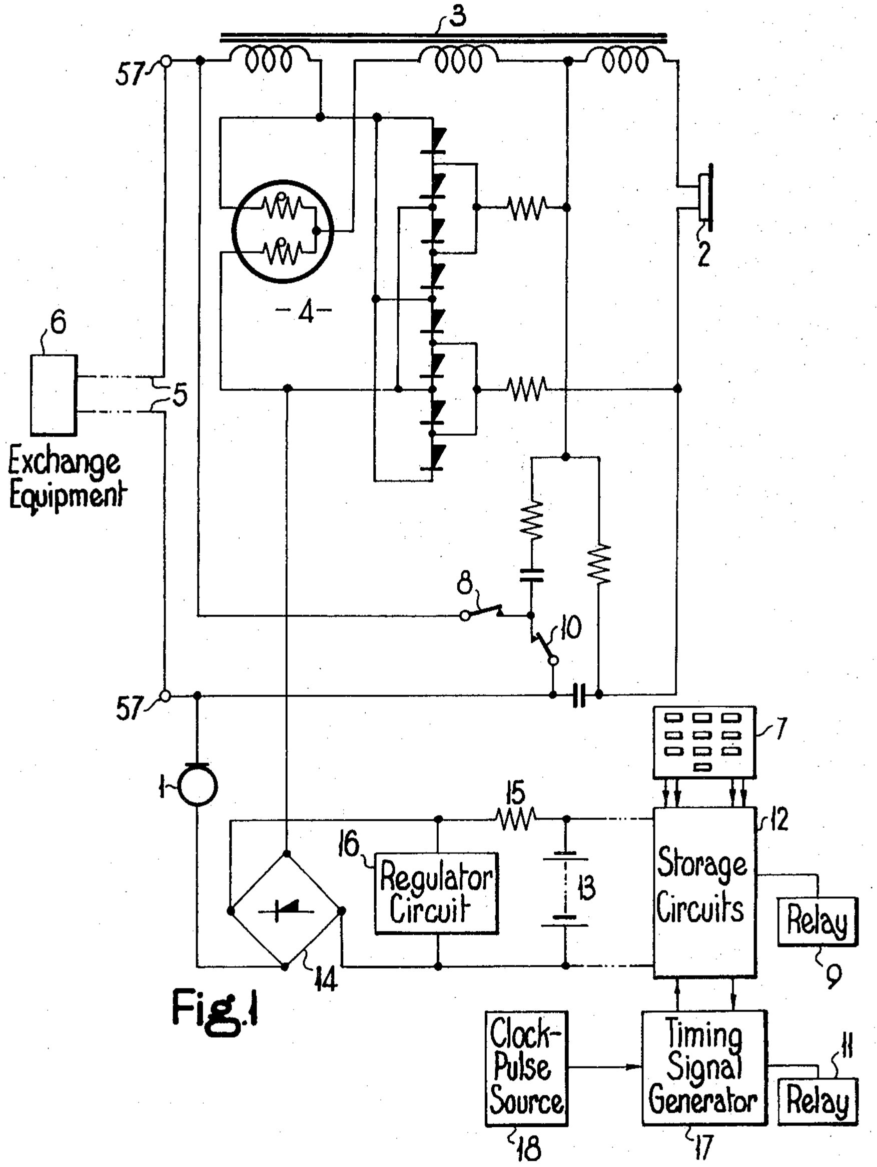

A timing signal generator for use in a push-button telephone instrument, the generator being in accordance with the present invention, will now be described by way of example with reference to the accompanying drawings, of which:

FIG. 1 shows parts of the telephone instrument schematically, while

Figure 4:
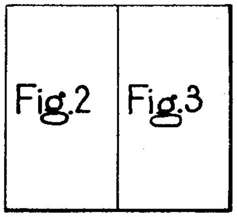
Figure 2:
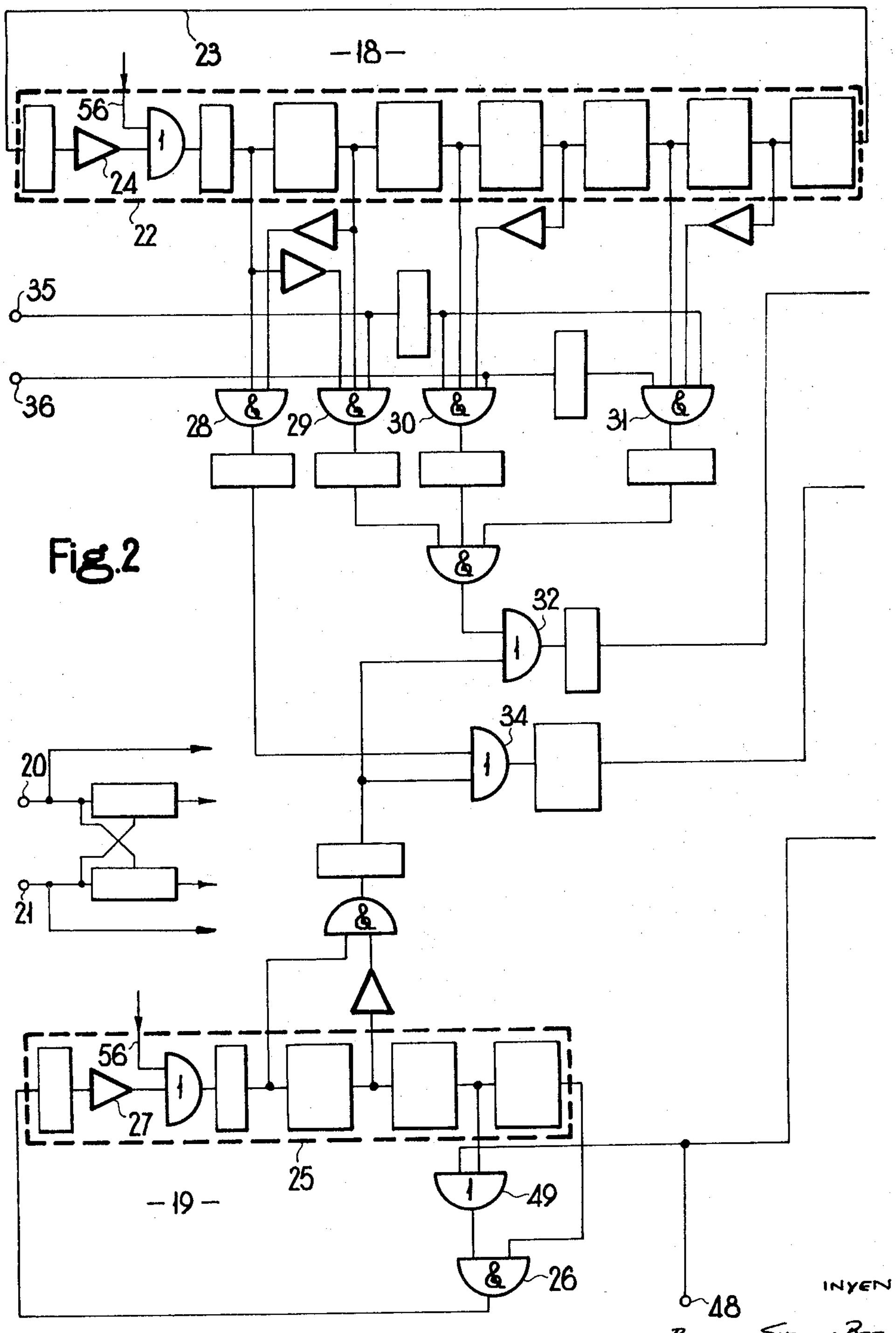
Figure 3:
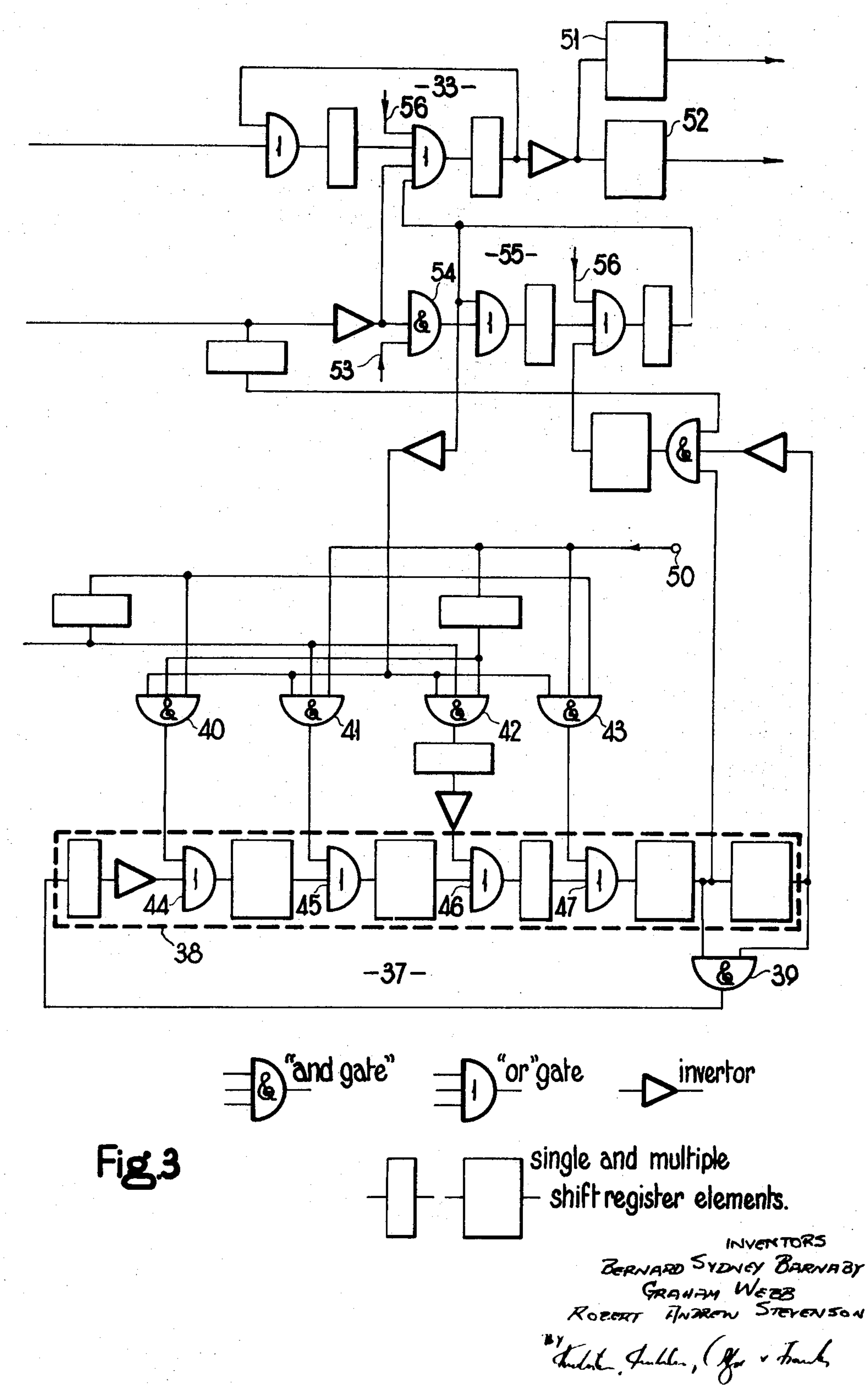

FIGS. 2 and 3, when arranged as shown in FIG. 4, show the timing signal generator schematically.

Referring first to FIG. 1, the push-button telephone instrument comprises the speech transmission circuits of a conventional telephone instrument, including a microphone transducer 1, a receiver transducer 2, an induction coil 3 and a sensitivity regulator 4. These speech transmission circuits are arranged to be connected in operation by way of a pair of line terminals 57 and a pair of line wires 5 to exchange equipment, indicated in the drawing by the block 6.

The dial of the conventional instrument is replaced by a set of ten push buttons 7, while the dial off-normal contacts and the dial impulsing contacts are replaced respectively by a set of "make" contacts 8 of a relay 9 and a set of "break" contacts 10 of a relay 11. Since the push-buttons 7 can be pressed in succession much more rapidly than a conventional dial can be operated, the signals derived by operation of the push buttons 7, which may for example be binary coded signals, are stored in a storage circuit 12 until they can be converted in their turn for signalling to the exchange equipment 6.

The storage circuit 12 is required to operate only during impulsing, that is, during periods when the line wires 5 are alternately short circuited by the contacts 8 and open circuited by the contacts 10. Under such conditions the circuit 12 cannot be energized directly from a battery at the exchange (not shown), and a battery 13 is therefore provided either within the instrument or housed close by the instrument, this battery 13 being recharged from the exchange by way of the line wires 5 during those periods in the course of each telephone call when impulsing is not taking place. The battery 13 is connected in series with the microphone 1, which may for example be a carbon granule microphone, by way of a rectifier bridge 14 and a current limiting resistor 15, and a shunt regulator circuit 16 is connected effectively in parallel with the battery 13. If a dynamic microphone (not shown) is used the battery 13 may be connected effectively directed across the line wires 5. The rectifier bridge 14 enables charging with either polarity of exchange supply.

Referring also to FIGS. 2, 3 and 4, a timing signal generator 17 derives from the output of a clockpulse source 18 trains of "dialling" pulses respectively representing the digit values entered in the storage circuit 12. These trains of "dialling" pulses are applied to energize the relay 11 so that the contacts 10 of that relay open and close to signal the pulses to the exchange equipment 6.

Referring particularly to FIGS. 2 and 3, the timing signal generator 17 comprises frequency divider circuits 18 and 19 respectively dividing by 44 and 45 the output frequency of the clock pulse source 18, which operates at 20,000 pulses per second. Two interlaced trains of clock pulses at this frequency are applied to terminals 20 and 21 (FIG. 2) and these trains of pulses, together with two antiphase square waves of the same frequency derived from them, are used to time the operation of the frequency divider circuits.

The frequency divider 18 comprises a 22 stage binary dynamic shift register 22 which is arranged to be cyclic in operation by means of a connection 23 between its output and input. The first stage of the shift register 22 includes an inverting stage 24 so that any particular digit returned from the output of the register 22 passes on through the register in inverted form, that is, a "one" instead of a "zero" and vice versa, and is restored to its original form for the next pass through the register 22. Because of the inverting stage 24 therefore any digit or sequence of digits appears in its original form at any point in the register 22 only on every other passage. The shift register 22 is stepped at the clockpulse frequency, and a sequence comprising 22 "zeros", followed by the inverse sequence of 22 "ones" is stepped through the register 22 during a complete cycle, so that the digit sequence 01, say, appears at a given point in the shift register once every 44 clockpulses. A cyclic shift register including an inverting stage as described above is sometimes referred to as a "twisted ring" circuit.

The divider circuit 19 comprises a 23 stage shift register 25 which is arranged to be cyclic in operation by means of an "and" gate 26 whose inputs are connected to the last two stages of the register 25 and whose output is connected to the input of the first stage of the register 25. An inverting stage 27 is again included, and due to this and the "and" gate feedback a sequence of 23 "ones" and 22 "zeros" is stepped through the register 25 during a complete cycle, so that the digit sequence 01, say, appears at a particular point in the register 25 once every 45 clockpulses.

Gating circuits 28 to 31 responsive either to the sequence 01 (gates 28, 30 and 31) or to the sequence 10 (gate 29) are provided at four points along the register 22 of the divider circuit 18 to give outputs at four predetermined points in the cycle of the divider circuit 18. The output of the gate 28 is combined with an output from the divider circuit 19 in a gating circuit 32 (FIG. 2) to set a bistable circuit 33 FIG. 3) to mark the beginning of a "make" period in a "dialling" pulse train, while the output of one or other of the other three gates 29, 30 and 31 of the divider circuit 18, depending on the mark/space ratio required, is combined in a gating circuit 34 (FIG. 2) with the output of the divider circuit 19 to reset the bistable circuit 33 to mark the beginning of a "break" period. Since the two divider circuits 18 and 19 prove output pulses at any given output point respectively once every 44 and every 45 clockpulse coincident output pulses to time the make and break periods occur only every 1,9080 clockpulses, so that the dialling pulses are generated at a rate of approximately 10 per second.

A particular mark/space ratio is selected by logic potentials applied to terminals 35 and 36 (FIG. 2), by means of which one or other of the gates 29, 30 and 31 is enabled to iniate a "break" period. In a particular example the mark/space ratios available were 1:1, 2:1 and 1.5:1 respectively.

A third "twisted ring" divider circuit 37 (FIG. 3) is provided which comprises a seven stage shift register 38 having an "and" gate feedback path 39 similar to that of the divider circuit 19 so that the circuit 37 gives an output pulse for every thirteen clockpulses. Four clamping gate circuits 40, 41, 42 and 43 are provided along the length of the register 38, in operation one or other of these clamping gate circuits 40 to 43 being responsive to input signals thereto indicating the required duration of the interdigit pause between trains of dialling pulses to apply a "one" signal to a respective "or" gate 44, 45, 46 and 47 in the shift register 38.

A logic "1" signal may be applied by way of a terminal 48 (FIG. 2) to a gate 49 in the divider circuit 19 so as to change the division ratio of that circuit to 46. In this case coincident output pulses from the divider circuits 18 and 19 occur every 1012 clockpulses so that the "dialling" pulse rate becomes approximately 20 per second. The signal at the terminal 48 is applied to inputs of the gates 40 to 43 to select an appropriate interdigit pause, together with a logic signal at a terminal 50 which enables selection of a "short" or a "long" interdigit pause.

An output signal derived from the setting and resetting of the bistable circuit 33 is applied by way of a buffer circuit 51 (FIG. 3) to cause the relay 11 to be energized and de-energized such that its contacts 10 break and make the line loop, and another output from the bistable circuit 33 is applied by way of a buffer circuit 52 to a "counting down" circuit arrangement in the storage circuit 12.

As the dialling pulses representing any one digit in the storage circuit 12 are generated for transmission to the exchange equipment 6 the digit value remaining in the storage circuit 12 is progressively counted down to zero. When this point is reached a signal is applied from the storage circuit 12 over a path 53 (FIG. 3) to a gate 54 to cause a second bistable circuit 55 to be set to initiate an interdigit pause at the end of the last break period. The setting of the bistable circuit 55 applies a signal to hold the bistable circuit 33 in the 'reset' condition, indicating a "loop make," for the duration of the interdigit pause, and in addition removes a logic "one" input signal from each of the four clamping gate circuits 40 to 43 of the divider circuit 37. The resulting change in output of one of these clamping circuits 40 to 43 to a logic "zero" initiates the timing of the interdigit pause, the bistable circuit 55 being reset when output signals from all three divider circuits 18, 19 and 37 occur together. The duration of the pause is determined by the position along the register 38 of the clamping circuit which initiates the pause. When the bistable circuit 55 has been reset the pulses representing the next digit in the storage circuit 12 can be generated.

While one or more digit values are stored in the storage circuit 12, gating means (not shown) in the circuit 12 are arranged to apply an enabling signal to the timing signal generator 17 at the points 56 (FIGS. 2 and 3), this same signal causing the relay 9 to be energized so as to close its contacts 8. Then the storage circuit 12 is emptied the enabling signal is removed so that the timing signal generator 17 is clamped, and the relay 9 releases.

The storage circuit may be of the form described in co-pending United Kingdom patent application No. 1923/68.

We claim:

1. An electric impulse transmitter for a push-button telephone instrument including electric storage means for storing digit values selected by operation of respective push-buttons of the instrument, wherein means for timing impulse trains representative of the digit values stored in said storage means comprises a pulse generator, at least two frequency dividing circuits each responsive to a different number of pulses from the output of said pulse generator periodically to provide a respective output pulse, and gating means to derive timing signals for timing the mark and space intervals of said impulse trains in response to coincident output pulses from two of said frequency dividing circuits.

2. An electric impulse transmitter for a push-button telephone instrument including electric storage means for storing digit values selected by operation of respective push-buttons of the instrument, wherein means for timing impulse trains representative of the electric signals stored in said storage means comprises a pulse generator, three frequency dividing circuits each responsive to a different number of pulses from the output of said pulse generator to provide a respective output pulse, gating means to derive timing signals for timing the mark and space intervals of said impulse trains in response to coincident output pulses from two of said frequency dividing circuits, gating means to derive timing signals for timing the interdigit pause intervals between said impulse trains in response to coincident output pulses from all three of said frequency dividing circuits.

3. An electric impulse transmitter in accordance with claim 1 wherein each of the frequency dividing circuits comprises a respective multistage shift register which is made cyclic in operation by a feedback connection from its output stage to its input stage.

4. An electric impulse transmitter in accordance with claim 3 wherein the feedback connection includes an inverting stage.

5. An electric impulse transmitter in accordance with claim 1 wherein the means for timing impulse trains is formed substantially as a single-chip integrated circuit utilizing metal-oxide-semiconductor transistors.

6. In a push-button telephone instrument for connection to conventional dialling-impulse type exchange equipment, an electric impulse transmitter comprising a set of push buttons, electric storage means for storing digit values selected by operation of respective ones of said push-buttons, switching circuit means to generate trains of impulses in dependence upon the digit values stored in said storage means, and interval timing means comprising a pulse generator, at least two frequency dividing circuits each responsive to a different number of pulses from the output of said pulse generator periodically to provide a respective output pulse, gating means responsive to coincident output signals from two of said frequency dividing circuits to time the generation by said switching circuit means of said impulses, a pair of line terminals for the instrument, and means responsive to said impulses selectively to establish a low impedance path between said line terminals.

7. An electric impulse transmitter in accordance with claim 6 wherein the interval timing means comprises three frequency dividing circuits, and there are provided gating means responsive to coincident output signals from all three of said frequency dividing circuits to time interdigit pauses between respective trains of impulses.

* * * * *